July 14, 1936. G. B. HART 2,047,321
FLOWER CONTAINER
Filed March 28, 1935 2 Sheets-Sheet 1

INVENTOR
George B. Hart
BY
Frank Keifer
ATTORNEY

July 14, 1936. G. B. HART 2,047,321
FLOWER CONTAINER
Filed March 28, 1935 2 Sheets-Sheet 2

INVENTOR
George B. Hart
BY
Frank Kiefer
ATTORNEY

Patented July 14, 1936

2,047,321

UNITED STATES PATENT OFFICE 2,047,321

FLOWER CONTAINER

George B. Hart, Brighton, N. Y.

Application March 28, 1935, Serial No. 13,499

7 Claims. (Cl. 47—41)

The object of this invention is to provide a tank and a display or storage stand or rack for flowers, that will hold the flowers with their stems in the water and hold the flowers themselves out of the water, and will display the flowers to good advantage, and from which stand the flowers can be easily removed.

Another object of the invention is to provide a tank and a rack on which a number of bunches of flowers can be displayed together, with the stems of the flowers in the water and the flower held above the water, the rack permitting the lifting of all the flowers, collectively, withdrawing their stems from the water.

These and other objects of the invention will be fully illustrated in the drawings, described in the specification and pointed out in the claims at the end thereof.

In the drawings.

In the drawings like reference numerals indicate like parts.

Figure 1:
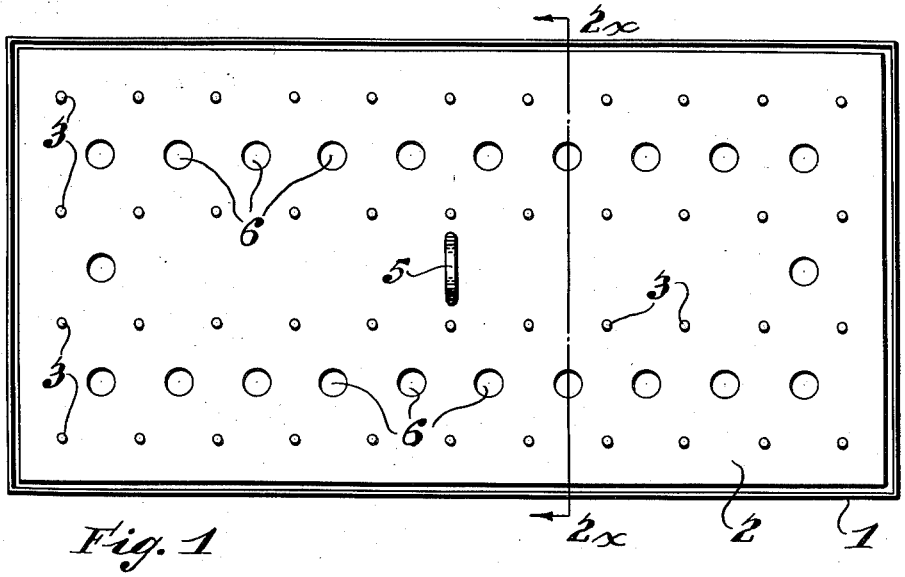
Figure 1 is a top plan view of the tray for holding the flowers and the water tank in which the tray is submerged.
Figure 2:
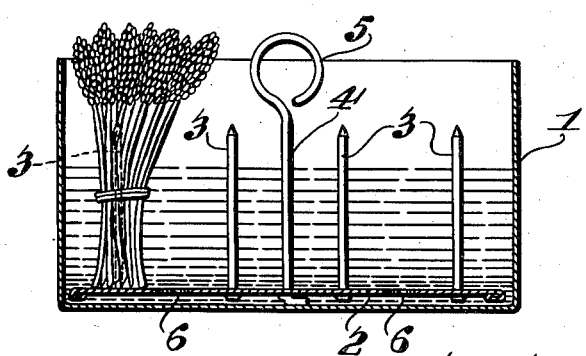
Figure 2 is a vertical section on the line $2x$—$2x$ of Figure 1.

In the drawings reference numeral 1 indicates a tank which is adapted to hold water. As shown in Figures 1, 2, 4 and 5 this tank is rectangular. As shown in Figures 1 and 2, a tray 2 is provided, which consists of a flat plate having a number of upright pins 3, 3, or stem holders, fastened therein. To the central part of this tray is fastened a pin 4, the upper part of the pin being bent at 5 to form a handle.

The tray is perforated with openings 6, 6 as shown in Figure 1, through which the water can pass as the tray is lowered into the tank or drawn up from the tank. It is understood that the tray is substantially rectangular in shape, and makes a loose fit with the rectangular tank in which it is submerged.

The flowers are tied in bunches, such as, sweet peas, lily of the valley, violets, etc. The stems of each bunch are suitably held together by string, or otherwise. The bunch of flowers is impaled on one of the pins or holders 3, with the ends of the stems placed near the bottom of the pin. A bunch of flowers will be placed on each pin. With the tray so equipped, the tray can be bodily immersed in the tank, or can be withdrawn therefrom.

Figure 3:
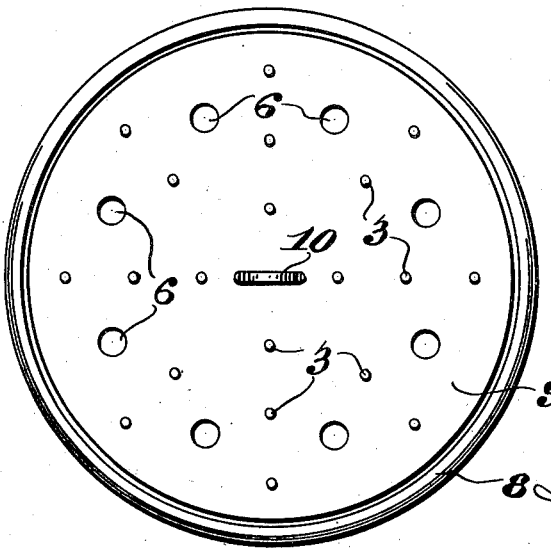
Figure 3 is a top plan view of a modified form of the tray and tank, the tank being cylindrical in form.

In Figure 3, I have shown a round or cylindrical tank 8, in which is provided a round or circular tray 9, having a handle 10 fastened thereon. The tray is likewise provided with pins 3, 3 and with openings 6, 6 therein, as above described in connection with Figures 1 and 2. The tray is lifted out of the tank, or submerged in the tank, by using the handle 10 as above described, the handle 10 being substantially the same as the handle 5 shown in Figure 2.

Figure 4:
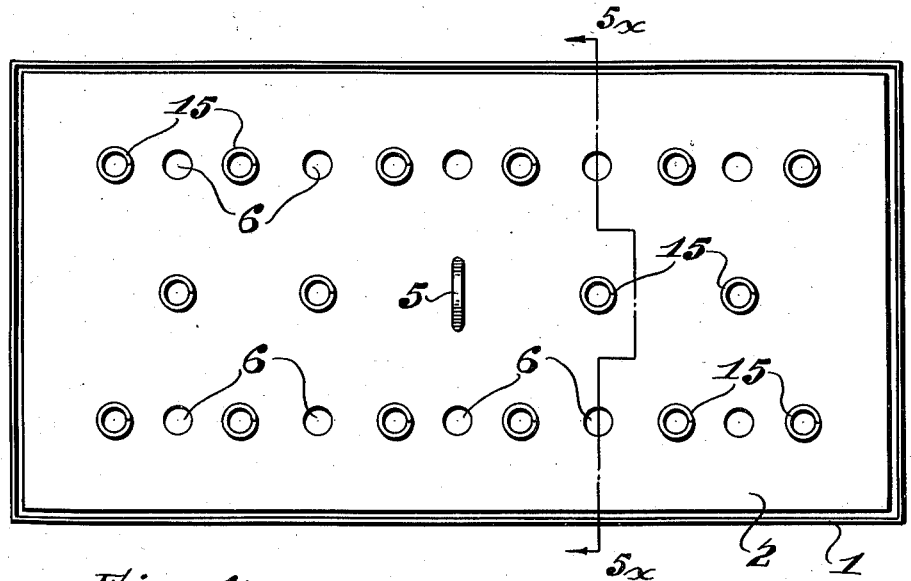
Figure 4 is a top plan view of a tray, and the tank therefor, having a modified form of flower holders.

In Figure 4, I have shown a similar tank 1 having a tray 2 therein, with a pin 4 and handle 5 fastened thereto. This tray has openings 6, 6 therein, which permit the water to pass freely through them as the tray is placed down in the tank and withdrawn from the tank.

Figure 5:
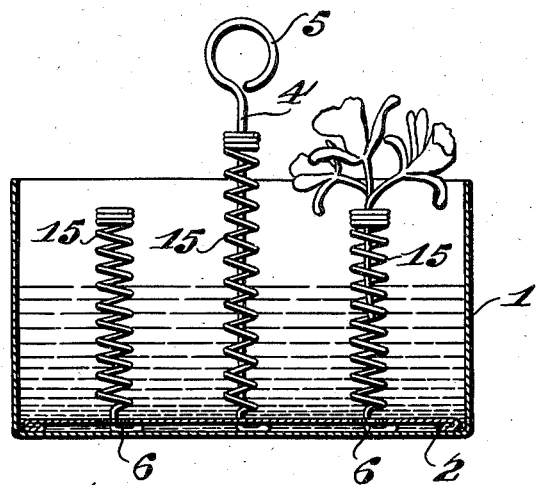
Figure 5 is a vertical section on the line $5x$—$5x$ of Figure 4.

Instead of the pins 3, 3 shown in Figures 1, 2 and 3, I provide another type of support, namely, helical coils 15 of wire, which coils are fastened in the tray as shown at the bottom of Figure 5. The helical coils or stem holders are adapted to receive long stems of individual flowers, such as orchids, or other equally expensive flowers. The stem of but one flower is inserted in each of the coils 15, 15, so that the flowers are securely supported and held apart, so that they will not be damaged while being displayed or stored. With this device, the rack can be easily and quickly lifted out of the tank, or placed back in the tank, so that the ends of the stems will be immersed in water and the flowers will be securely held above the water.

As shown in Figure 5, the middle row of stem holders 15 will be longer and will extend higher above the tray than the stem holders 15 on either side thereof.

I claim:

1. A rack for displaying flowers comprising a plate, a plurality of coiled wire stem holders extending upwardly therefrom, each of said holders adapted to receive therein the stem of a flower the length of the coil being several times the diameter thereof.

2. A device for displaying flowers comprising a plate, a plurality of supporting pins extending upwardly therefrom and suitably spaced apart thereon, each of which is adapted to hold a plurality of flowers with their stems tied in a bunch and placed parallel to the pins.

3. A device for displaying flowers comprising a plate, a plurality of supporting pins extending upwardly therefrom and suitably spaced apart thereon, each of which is adapted to hold a plurality of flowers with their stems tied in a bunch, a tank adapted to hold water in which said plate and supports can be immersed, said plate having holes therein through which the water can flow either up or down.

4. A rack for displaying flowers comprising a plate, a plurality of pins extending upwardly therefrom and suitably spaced apart thereon, each of which is adapted to hold a plurality of flowers with their stems tied in bunches and placed parallel to the pins.

5. A device for displaying flowers comprising a plate, a plurality of supports extending upwardly therefrom each of which is adapted to hold flowers, a tank adapted to hold water in which said plate and supports can be immersed, said plate having holes therein through which the water can flow either up or down, a handle attached centrally to said plate and extending upwardly therefrom above the supports by which said plate is adapted to be raised or lowered.

6. A device for displaying flowers comprising a plate, a plurality of wire coil supports extending upwardly therefrom each of which is adapted to hold flowers, a tank adapted to hold water in which said plate and supports can be immersed, said plate having holes therein through which the water can flow either up or down, a handle attached centrally to said plate and extending upwardly therefrom above the supports by which said plate is adapted to be raised or lowered.

7. A device for displaying flowers comprising a plate, a plurality of pin supports extending upwardly therefrom each of which is adapted to hold flowers, a tank adapted to hold water in which said plate and supports can be immersed, said plate having holes therein through which the water can flow either up or down, a handle attached centrally to said plate and extending upwardly therefrom above the supports by which said plate is adapted to be raised or lowered.

GEORGE B. HART.